Feb. 24, 1959     S. N. F. LUBOSHEZ     2,874,612
THERMAL INSULATOR
Filed March 9, 1956     2 Sheets-Sheet 1
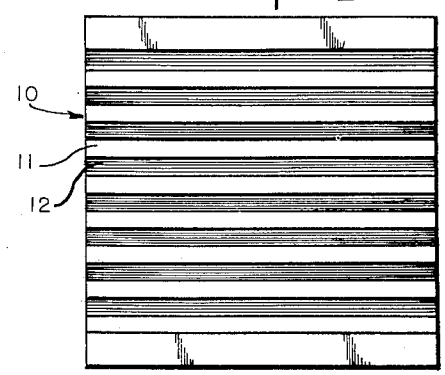
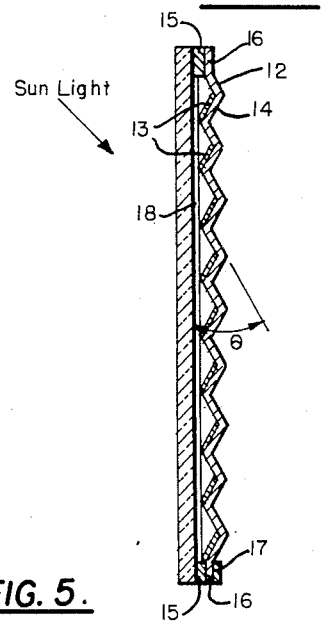
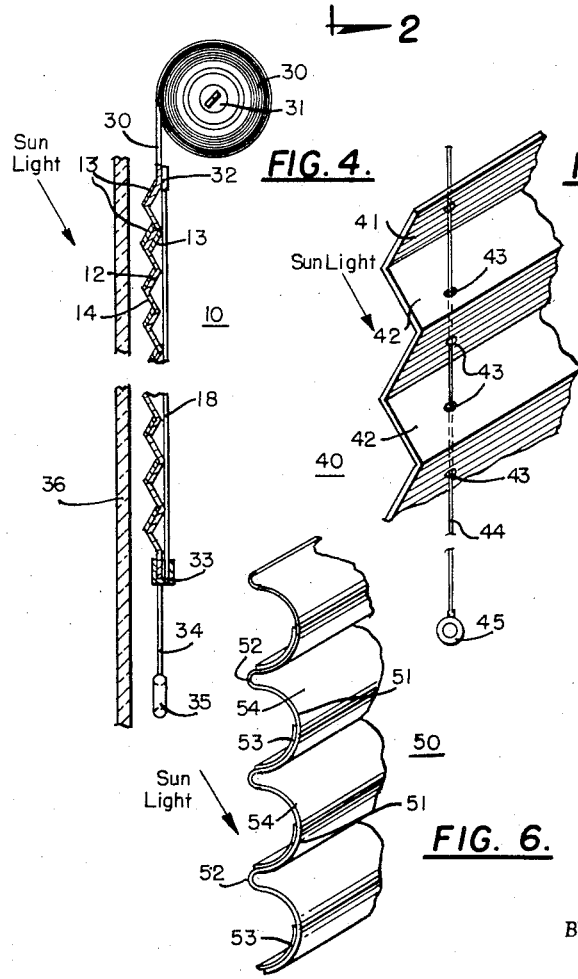
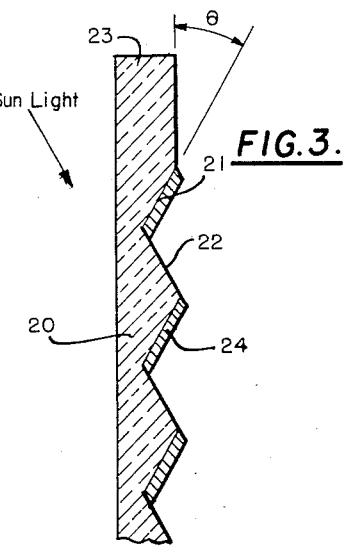
INVENTOR
S. N. FERRIS LUBOSHEZ
BY
ATTORNEYS Feb. 24, 1959     S. N. F. LUBOSHEZ     2,874,612
THERMAL INSULATOR
Filed March 9, 1956     2 Sheets-Sheet 2
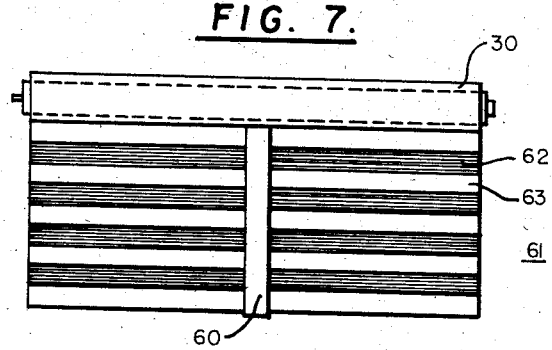
FIG. 7.
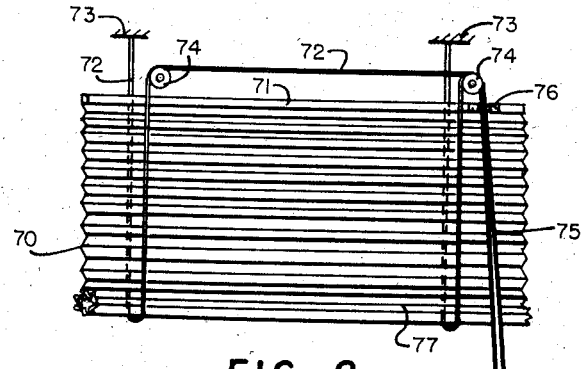
FIG. 8.
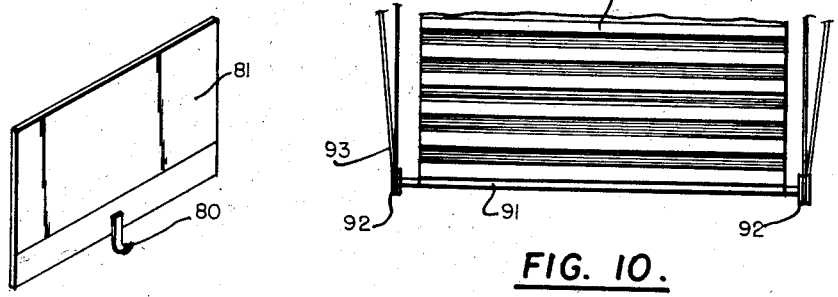
FIG. 9.
FIG. 10.
INVENTOR
S. N. FERRIS LUBOSHEZ
BY
ATTORNEYS

United States Patent Office 2,874,612
Patented Feb. 24, 1959

2,874,612

THERMAL INSULATOR

Sergius N. Ferris Luboshez, Bethesda, Md.

Application March 9, 1956, Serial No. 570,640

8 Claims. (Cl. 88—60)

The present invention concerns a new and highly efficient device for shielding a space from heat radiation, convection and conduction.

The present application is a continuation-in-part of my copending application Serial No. 328,270, filed December 29, 1952 for: "Thermal Insulator," now abandoned. Reference is also made to my copending application Serial No. 449,615, filed August 13, 1954, for "Radiation Shield," covering related subject matter.

It is an object of the invention to provide a combination roller shade and thermal insulator.

It is an object of the invention to provide simple inexpensive means which will simultaneously reflect heat and admit light through a window of a room, car, or other space.

It is an object of the invention to provide a lightweight resilient means which can be readily attached to or detached from the window of house or car.

It is an object of the invention to provide a structural element which can be incorporated in a window pane, a panel or wall or roof construction member.

It is an object of the invention to provide a transparent member with sections angularly disposed to each other and with every other section coated on at least one side with heat-reflecting material.

It is an object of the invention to corrugate a cellulose acetate, polyester film or similar transparent organic material, and to apply thin metallic strips to at least one side of each corrugation so as to produce a stepped reflector.

It is an object of the invention to provide a heat insulation means, as described above, with corrugations of any convenient width which might be between ½ and 1/32 of an inch, and even up to two inches, the construction being imperforate so that when parts of it are adhered to a pane of glass, a body of still air of high insulating value is held between the corrugated material and the glass window.

It is an object of the invention to provide a glass or transparent plastic plate with at least one corrugated surface, with one side of each corrugation coated with a thin metallic reflecting strip.

It is an object of the invention to vary the angle of corrugation to correspond with the latitude of installation, so that maximum reflection of the sun's rays can be obtained.

It is an object of the invention to provide thermal insulation attached to the lower end of a standard roller shade, so that (a) the shade can be pulled down all the way in the usual manner; (b) may be pulled down half way so that the lower half of a window is covered by light-admitting thermal insulation, while the upper half is covered by the shade; (c) may be raised so that only the upper half of the window is covered by the thermal insulator; (d) the whole assembly can be rolled on the roller, leaving the window unobstructed; and (e) any intermediate position may be selected.

In many modern homes, railways and automobiles, the controlling load for any air-conditioned unit is extremely variable because of the intensity of the sun's rays. This factor requires large motor capacity to take care of maximum load during the heat of the day. In many rooms, whether or not air-conditioning is employed, solar radiation is the most important heat factor. Where air-conditioning is employed, the cooling load in an ordinary office building due to solar radiation alone may amount to as much as 75% of the total load. As the rays of the sun enter a room immediately, there is no phase delay and in the northern latitudes of 40° for example, the insulation must be designed to take care of the sun load as late as 4 o'clock in the afternoon in the summer. At a latitude of 40°, this load can amount to 211 B. t. u.'s per square foot of window area per hour. If a room is assumed to have two windows, each 5 x 12 feet, giving a total area of 120 square feet, that would amount to 24,000 B. t. u.'s per hour. If a one-ton air-conditioning unit absorbs 12,000 B. t. u.'s per hour, these two windows would require two one-ton refrigeration units to take care of them alone, in addition to the remaining heat load to which the room may be subject. These figures give some idea of the importance of eliminating radiant heat at the windows of a room, or other space where cooling is desired.

Hot summer sun is absorbed by window glass and masonry which then reradiates the heat in the manner of a hot panel. It is therefore an object of the invention to reduce the admission of such heat to the interior of a space to be shielded. Moreover, it is only during the day that the invention may be used for this purpose. In cities at night the hot buildings, having absorbed the sun's rays during the day, reradiate them as heat rays at night. This accounts in large measure for the summer heat of cities at night as compared with that of the open country. It is an object of the invention to serve as a shield against such radiation, and where air conditioning is used, to reduce thereby the cooling load. It will be readily apparent that in modern construction where large areas of glass are frequently used, the additional load in the air conditioning equipment can be a very considerable factor, greatly reducing the effectiveness. In winter it is often desirable to admit the direct rays of the sun and it is also desirable to prevent the escape of indoor heat outwardly.

It is an object to accomplish this dual purpose by the same structure as is used to exclude the sun in the summer time. To accomplish this purpose the present structure may be reversed or rotated in its plane through 180° so as to present the light-admitting strips to the sun, the metal covered strips serving to prevent the outward escape of heat radiation from the interior. It will be seen that artificial heating requirements are thus reduced.

For the purpose of this invention, it is to be noted that most of the material of the earth's surface, including even water and snow, radiates very nearly as a black body with close to 100% efficiency. For the range of temperature under consideration the amount of terrestrial radiation may be computed for the mean annual average temperature of the earth's surface which is approximately 288° centigrade absolute. The terrestrial radiation is thus found to amount to 115 units of cooling. The water vapor of the atmosphere is much more absorptive of this long-wave terrestrial radiation than it is of the incoming short-wave solar radiation. Water vapor is quite opaque to all but a narrow band of the terrestrial radiation, so that with clear skies an average of only 22 of the 115 cooling units is transmitted through the atmosphere and lost to space. A layer of clouds intercepts the terrestrial radiation completely. Consequently on the average approximately 11 of the 115 cooling units are actually lost to space. The remaining 104 units are absorbed by the water vapor of the lower atmosphere, which is correspondingly heated. The greater part of this intercepted energy is radiated by the atmosphere downward to the earth's surface where it is completely absorbed to maintain the high temperature and a radiational output of the ground's surface greater than the entire incident solar energy, see the article "Meterology" at page 352 of the Encyclopedia Britannica, vol. 15, 1951.

It is an object of the invention to provide a shield against such terrestrial radiation whether by day or night, in sunlight or in cloudy weather. In cinematography and television the intense artificial lighting required is accompanied by undesirable heat. It is an object of the invention to serve as a shield against this heat, while admitting light, by discriminating between the direct beam radation from the source and the indirect general lighting, excluding the former and admitting the latter.

For the purposes of this invention, it is necessary to distinguish carefully between radiation from a hot source such as the sun, and radiation from a cooler source within the range of temperatures found on earth, for the reason that a substance may differ radically in reflective power respecting sources of widely differing temperatures. For the purposes of this invention it is necessary to distinguish between substances which reflect heat and those which reflect light. In general, electric insulators reflect light in accordance with their color. They do not reflect heat but absorb it.

On the other hand, metallic surfaces are practically opaque to heat rays and reflect them. They also reflect light in varying degrees dependent on their color. There is a direct relationship between the electrical conductivity of a substance and its power to reflect heat. There are thus two distinct classes of substances, one of which absorbs heat and the other of which reflects heat with great efficiency. One is a non-conductor of electricity and the other is a conductor of electricity, a metal. All metals show low reflectivity for ultraviolet with increasing values through the visible spectrum, and acts as almost perfect mirrors for infrared and longer wavelengths. By contrast, a comparision of the results of tests on a large number of different materials reported by many investigators indicates that practically all non-metallic materials such as water, snow, turf, porcelain, glass, rubber, paper (white or black), cloth, refractories, building materials, enamels, and paints of any finish or color have emissivities between 0.85 and 0.95. Because of the correspondence of emission and absorption, the same non-metallic materials will absorb between 85% and 95% of the heat radiation falling upon them, whereas a metallic surface may absorb less than 5%.

Thus, in this invention for a thermal insulator, it is essential that the reflective surfaces be metallic for maximum reflection of heat rays. White paints reflect light but not heat. White powders such as magnesium oxide and magnesium carbonate are outstandingly good reflectors of light. However, for heat radiation at a wavelength of 8.8 microns for example, black velvet is superior to magnesium oxide as a reflector. This is within the range of radiation from sources at terrestrial temperatures. White substances are in reality transparent and transparent substances such as glass which transmit light, absorb heat and are quite opaque to certain heat rays. I have found that transparent plastics such as cellulose acetate and polyester film, while transmitting light, absorb heat radiation.

In this invention I have found that not only must a reflective substance be metallic, but for maximum efficiency at least one surface thereof must be exposed to the atmosphere and remain free of any transparent covering or support of plastic or glass. Consider what happens if both sides of the reflective substances are covered wtih an adherent light-transparent sheet of plastic or glass. The transparent covering, while transmitting light, inherently absorbs heat. The heat rays absorbed raise the temperature of the material. The heat is conducted through the screen to the interior surface and there reradiated. The reradiation takes place because good heat absorbing surfaces are inherently good emitters or radiators of heat.

Where, however, as in this invention, a bare metallic surface faces the incident heat radiation, the surface will reflect practically all the heat rays incident upon it and heat therefore will not be transferred into the space behind the screen. Moreover, while it may be preferable that the bare metallic surface face the incident heat radiation, if desired in this invention, the transparent support may face the incident heat radiation with the uncovered metallic surface facing in the opposite direction, inwards. In this case the incident heat radiation is absorbed by the transparent base material and equilibrium is maintained at a somewhat higher temperature, such that the rate of heat loss equals the rate of heat gain. However, the heat will not be reradiated inwards by the uncovered metallic surface in relatively significant amount, even at the higher temperature, since a good reflector of heat is inherently a poor emitter or radiator of heat for the same range of temperatures. Therefore, in this invention heat will not be transmitted through the screen, which remains a thermal insulator.

In this invention it is relatively immaterial which side of the screen faces the incident radiation, the essential feature being that for maximum efficiency, at least one side of the heat screen be provided with a bare metallic surface. A slight tarnish or film of oxidation reduces the efficiency of a metallic surface as a heat reflector, and conversely, increases its absorbing and radiating power, but such surface nevertheless remains many times superior to a dielectric substance as a reflector of heat. Similarly, the vehicle in metallic paints reduces the reflective efficiency, and correspondingly increases the absorbing and radiating power, of the metal depending upon the amount of vehicle used. Nevertheless, such paints are superior reflectors of heat as compared with dielectric substances.

I have found that very thin films or deposits of metal upon the base material are sufficient to provide opacity to light rays and reflectivity for heat rays for the purpose of this invention. Thus, a metal thickness of a thousandth of an inch or less is sufficient, depending upon the degree of opacity desired. White paints and powders, being in reality transparent, require great thicknesses for opacity and they do not reflect heat.

In the drawings, like numerals refer to like parts throughout.

Figure 1 is a front elevation of one form of the invention.

Figure 2 is a section along lines 2—2 of Figure 1.

Figure 3 is a fragmentary sectional view of the invention as applied to a pane of glass or transparent rigid plastic.

Figure 4 is an end view of a novel combination of thermal insulator and window shade.

Figure 5 is a fragmentary perspective view of a modified form of the invention.

Figure 6 is a sectional view of another modified form of the invention.

Figure 7 is a front elevation of an improved form of shade pull in combination with novel shade structure.

Figure 8 is a front elevation of a modification of the invention.

Figure 9 is a perspective view of mounting means for the modification shown in Figure 8.

Figure 10 is a fragmentary view of a variation of Figure 8.

A cellulose acetate or polyester sheet 10, or sheet of other pliable material, is cut to a suitable size to fit a desired window when installed; and is corrugated, as at 11, with corrugations which vary, for example between two inches and 1/32 of an inch, from crest to crest. Corrugations 11 have an upper angularly disposed portion 12, to the inner or outer side of which is adhered an aluminum foil strip 13 of high reflecting power. Cellulose sheet 10 has a heat-sealing or other adhesive coating to which narrow strips 13 are adhered or attached.

If desired, strips 13 are rolled on, and may be applied as foil, or as a paint or powder with lesser reflecting power. Other metals such as silver, chromium, etc. may be used if desired. The under corrugation 14 is left clear to admit indirect light. Although the sections 12 and/or 14 may be perforated to admit air, when maximum insulation is required, the entire sheet 10 is left imperforate.

The corrugated sheet 10 is resilient and may be stored collapsed. When extended for use, it is, in the simplest form of my invention, attached or adhered to the inner side of a glass pane by tacky material 15, along each end edge 16. Edges 16 are made strong enough to maintain the shape of the article and may be reinforced or weighted, as at 17, if necessary. In this form the device is readily usable in houses, automobiles, and the like, wherever there are glass windows. Alternatively, the corrugated sheet may be affixed to the window frame instead of to the glass. Where the sections 12 or 14 are perforated and air circulation is desired, sheet 10 may be weighted by a bar along hte bottom to keep it stretched. In other forms of my invention, cords or bands are attached to the bottom of the screen and passed over small pulleys or rollers at the top of the window frame to facilitate raising, lowering and adjusting the screen, as is well known with ordinary Venetian blinds. These cords may pass down the outer and inner sides of the screen near the ends, or may pass through small openings provided for the purpose in the flat areas 12, 13. In this, as well as in the more simple form of my invention, guide cords or wires may be threaded through small holes in the flat areas 12, 13 and strung tightly from the top to the bottom of the window frame. As a consequence of the extreme lightness in weight of these screens, the cords may pass through guide tubes of plastic or other suitable tubing, and the complication and expense of pulleys and rollers is thus eliminated.

A string member 18 is attached to each end 16 so as to determine the exact amount of extension of the corrugations 12 and 14 so that the angle $\theta$ is optimum for a given parallel of latitude. Where the sheet 10 is used with a window shade on a roller, the strings 18 may be cloth tapes at each side of the sheet 10 to perform the double function of taking up the strain of rolling and determining the optimum extension of the corrugations.

Figure 3 shows the invention applied to a glass pane 20, the inside of which is corrugated at 21 and 22, with a free edge portion 23. An aluminum foil strip 24 is adhered to the upper corrugations 21, or they may be painted with suitable reflecting paint of metallic or other composition. Again, a deposit of metallic silver, chromium, or other reflecting material, may be applied and sealed on corrugations 21, leaving corrugation 22 clear.

It will be understood that a sheet, such as shown in Figure 1, may be attached to a window frame inside or outside. It may be used in lieu of glass or it may be used as a thermal pane storm window which both prevents glare and provides an insulating layer of still air. For such applications, the angle $\theta$ determining string 18 may be dispensed with, if desired.

Element 18 may take the form of a removable paper strip with latitude marks thereon, so that the assembly may be stretched an optimum amount to give the best value for the selected latitude. Once installed, the strip 18 may be removed. It is appreciated that the angle $\theta$ varies with the hours of the day and increasingly so as latitude increases. This can be allowed for by altering the amount of extension of the assembly. A second strip 18 marked in hours for a given latitude can be provided, if desired.

Figure 4 shows a combination shade comprising the ordinary shade material 30 of coated aluminum or the like, which may be light-impervious or translucent, mounted on a roller 31 of standard construction save that the spring has sufficient capacity to roll up the normal shade 30 plus the additional length of thermal sheet 10, which is preferably half as long as the shade 30 itself. Of course, it will be understood that the portion 10 may be as long as the portion 30, if desired, and so cover the entire window.

With this construction, the window shade portion 30 may be pulled down completely, leaving portion 10 hanging below the sill. The portion 10 may, of course, be compressed, if desired, and held by simple U-shaped spring clips. When some light is desired, the shade is raised so that portion 30 covers the top half of the window and portion 10 covers the bottom half. More light, without glare may be obtained by rolling the assembly up until the upper half of the window only is covered by the portion 10. Finally, a clear, unobstructed view may be obtained by rolling up the entire assembly 30, 10, as is done in the case of the ordinary window shade. Normally, however, the portion 10 may be rolled up the same as the rest of the shade, the corrugations meshing so that the rolled shade is not unduly bulky. The metallic coatings 13 are shown on both sides of corrugated sheet 12 for completeness. It will be understood that these metal portions 13 may be only on one side of the sheet 12 and the preferred form uses metallic coatings 13 on the outside of sheet 12 only.

Figure 5 shows a corrugated sheet 40 with metal strip coatings 41 mounted on the outside thereof, leaving alternate transparent portions 42. Holes 43 are provided to receive shade pull 44 with a finger ring 45 for raising and lowering the assembly without unduly stretching the corrugated sheet 40. Cord 44 takes the load and the sheet 40 rolls up with the corrugations meshing to reduce bulk.

Figure 6 shows a transparent sheet 50 with cylindrical segments 51 hinged together at 52. The lower half of each segment 51 is coated with a metal strip coating, metal paint or the like as at 53. Light is transmitted by the clear portions 54. This form of the invention may also be rolled up with the segments 51 in nesting relation. It may be attached to shade roller directly if desired.

In Figure 7 the form shown in Figure 5 has been modified by using a flat flexible strip 60 as a shade pull. When sheet 61 is rolled, the corrugations 62 and 63 mesh with the flat flexible strip 60 fitting smoothly therebetween.

In Figure 8 is shown another method of installation and construction according to the invention. A corrugated transparent sheet 70 with alternate corrugations coated with metal to form insulation shading as described above, is fastened at the top 71 adjacent the top of a window to be shaded. A cord 72 is looped around the bottom of shade 70 with its ends fixed to raised points 73 preferably above the window to be shaded. The cord 72 is looped around pulleys 74 as shown and provides a depending bight 75 with a suitable lock 76 which is well known in the shade art and will hold the rolled shade 70 at any desired height. The sheet or shade 70 rolls as shown at 77 with the corrugations meshing.

The extreme lightness of insulation shading permits a much neater and less bulky construction. Thus, it has been found entirely practical to support the pulleys by adhering them to a glass window. Similarly, the top edge of the shade can be adhered directly to the glass. The same applies to the fixed ends of the cords. It has been found that an entire window can be neatly equipped with insulation shading in this manner, in a few minutes, without the need of any tools, screws or hooks. This can be done by means of supporting hooks 90 attached to a piece of cloth 81 having an adhesive backing, as shown in Figure 9.

It has also been found practical to mount all the elements on a thin board and adhere or hang the board, as described above. For neatness, the board may be covered with a thin decorative sheet of any suitable material. In tests, it has been found that two supports, such as those shown in Figure 9, are sufficient to mount the entire mechanism, even when subjected to very rough treatment. It will be seen that there is no direct pull on the shade supports when the cord 75 is pulled for raising the corrugated shade 70. Furthermore, the light weight of the screen and its resilience or springiness, as compared with the normal type comprising wood or bamboo slats, produces an extremely small load and shock on the supports. This consideration permits of extremely long or wide shades which roll up evenly because of the meshing of corrugations. Note that although the diameter of the roll progressively increases as the shade is rolled up, the teeth-like corrugations continue to mesh since the pitch of the teeth corrugations remains constant.

The construction shown in Figure 8 may be improved, in the manner shown in Figure 10, in which the corrugated sheet 90 is provided with a stiffener 91 at the bottom, having over-running pulleys 92 at each end. The continuous cord 93 runs around the pulleys in substantially the same manner as the cord 72 runs around the wrapped portion of the shade 77 in Figure 8. In this case, the mechanism is identical with that already described except that the cord is not looped over the shade itself but is looped over the two over-running pulleys 92, one at each end of the bottom rod 91 to which the lower end of the shade is attached. Since pulleys 92 are over-running pulleys, no torque is transmitted when the shade is lowered. However, torque is transmitted when the shade is raised. This is accomplished by a free-wheeling mechanism or pawl acting on a suitable ratchet wheel.

This construction, shown in Figure 10, makes for a very small diameter, tightly meshed roll when the shade is fully rolled up. It may be noted that as the shade is rolled up, the constantly increasing diameter thereof will take up a greater length of shade per revolution. The pulley, however, remains of constant diameter. The difference in diameter puts a continuous tension on the stretchable corrugations of the shade and insures deep meshing of the corrugations, thus resulting in a tight, neat, and small roll at the top. The construction of Figure 10 takes care of any slippage of the cord or jerkiness of the operator in raising the shade.

As the shade is lowered, a reverse effect takes place, that is, the roller pays out more shade than the pulley can absorb without slippage. In order to compensate for this, the over-running clutch or pawl permits the shade to fall freely, or to unroll while the pulley revolves freely. It has been found that the simplest possible over-running device is sufficient to take care of the very small loads encountered.

The pulleys 92 may be about 1¼ inches in diameter, and of the type used in Venetian blinds. The pulley arrangement has the further advantage of keeping the cords at the very end of each window, close to the vertical members. Thus, very long or broad shades may be made without any intermediate tapes or cords for the gathering of dust and obstructing of the view. An unusually neat, decorative appearance results.

It may be noted that the shade in the several figures does not sag substantially no matter how long or broad it may be within the limits of normal use, since each element of length supports its own weight. Unlike other shades of the roll-up type, no vertical supporting tapes or cords are required.

While I have described above what are at present believed to be the preferred forms of my invention, it will be understood that various changes may be made therein by those skilled in the art without departing from the spirit of the invention. All such variations which fall within the true spirit of the invention are intended to be included in the appended claims in which generic terms have been employed to include all such variations and equivalent structures.

I claim:

1. A combined heat reflector and light transmitter structure for simultaneously excluding heat rays and for admitting light from a source of mixed radiation comprising a corrugated sheet of resilient, light-transmitting material, metallic heat-reflecting material on one side only of each corrugation leading to its crest, the other side of each corrugation leading to its crest being light transmitting, the metallic heat-reflecting material being on the same side of each corrugation leading to its crest, whereby the corrugated sheet forms alternating light-transmitting and heat-reflective bands, at least one side of the metallic material applied to the corrugations being exposed directly to the surrounding atmosphere, the heat-reflective material extending at an angle to the general plane of the sheet which is sufficiently different from a right angle that heat rays striking said metallic surfaces at a predetermined range of angles from a source above a horizontal plane passing through said surfaces will be reflected away from said surfaces and to the side thereof from which the rays originated, while the alternating light-transmitting bands will transmit light through the sheet.

2. A combined heat reflector and light transmitter structure as set forth in claim 1 in which the metallic heat-reflective material is aluminum.

3. A combined heat reflector and light transmitter structure as set forth in claim 1 in which said corrugated sheet is of cellulosic material and has adhesive material along the top and bottom edges thereof.

4. A combined heat reflector and light transmitter structure as set forth in claim 1 in which said corrugated sheet is made from flexible material.

5. A combined heat reflector and light transmitter structure as set forth in claim 1 in which said corrugated sheet is made of flexible material, whereby it may be stretched to vary the distance between the crests of the corrugations and the relative angle which the sides of the corrugations extending from the valleys to the crests thereof make with the general plane of the sheet and which includes means for limiting the amount to which the corrugated sheet may be stretched.

6. A combined heat reflector and light transmitter structure as set forth in claim 1 having means for supporting the corrugated sheet at its top and weight means attached to the bottom of the sheet to stretch the sheet.

7. A combined heat reflector and light transmitter structure as set forth in claim 6 which includes means for limiting the amount the corrugated sheet may stretch.

8. A window sheet having a roller and a sheet portion attached to the roller to be wound thereon, said sheet portion comprising a light intercepting upper portion and a lower combined heat-reflective and light-transmitting portion for simultaneously excluding heat rays and for admitting light from a source of mixed radiation, said lower portion comprising a corrugated sheet of resilient, light-transmitting material, metallic heat-reflecting material on one side only of each corrugation leading to its crest, the other side of each corrugation leading to its crest being light transmitting, the metallic heat-reflecting material being on the same side of each corrugation leading to its crest, whereby the corrugated sheet forms alternating light-transmitting and heat-reflective bands, at least one side of the metallic material applied to the corrugations being exposed directly to the surrounding atmosphere, the heat-reflective material extending at an angle to the general plane of the sheet which is sufficiently different from a right angle that heat rays striking said metallic surfaces at a predetermined range of angles from a source above a horizontal plane passing through said surfaces will be reflected away from said surfaces and to the side thereof from which the rays originated, while the alternating light-transmitting bands will transmit light through the sheet.

References Cited in the file of this patent

UNITED STATES PATENTS

| | | |
|---|---|---|
| 1,743,345 | S. Heilwell et al. | Jan. 14, 1930 |
| 1,937,342 | Higbie | Nov. 28, 1933 |
| 2,146,182 | Guyer | Feb. 7, 1939 |
| 2,205,523 | Galey | June 25, 1940 |
| 2,248,638 | Merton | July 8, 1941 |
| 2,280,358 | Tietig | Apr. 21, 1942 |
| 2,404,257 | Thomas | July 16, 1946 |

FOREIGN PATENTS

| | | |
|---|---|---|
| 1,007,902 | France | Feb. 13, 1952 |